United States Patent
Miansian et al.

(10) Patent No.: US 6,964,454 B1
(45) Date of Patent: Nov. 15, 2005

(54) WHEEL WITH CENTER SPINNER

(76) Inventors: James K. Miansian, P.O. Box 1600, Lake Forest, CA (US) 92609; Patrick Vogel, 3180 E. Willow St., Signal Hill, CA (US) 90755

( * ) Notice: Subject to any disclaimer, the term of this patent is extended or adjusted under 35 U.S.C. 154(b) by 0 days.

(21) Appl. No.: 10/942,511

(22) Filed: Sep. 16, 2004

(51) Int. Cl.[7] .............................................. B60B 7/20
(52) U.S. Cl. .............................. 301/37.25; 301/37.41
(58) Field of Search .............................. 301/37.25, 58, 301/95.104, 95.106, 110.5, 37.41; 280/217; 310/166; 40/587

(56) References Cited

U.S. PATENT DOCUMENTS

| | | | |
|---|---|---|---|
| 478,394 A | 7/1892 | Bretz | |
| 496,844 A | 5/1893 | Baker | |
| 639,567 A * | 12/1899 | Henderson | 280/217 |
| 1,568,672 A * | 1/1926 | Kellogg | 301/64.201 |
| 1,599,117 A * | 9/1926 | Conlon | 280/217 |
| 1,718,169 A | 6/1929 | Meldrum | |
| 2,741,047 A | 4/1956 | Pollock | |
| 2,778,690 A | 1/1957 | Horling | |
| 3,005,906 A | 10/1961 | Butler, Jr. | |
| 3,787,066 A * | 1/1974 | Hautier | 280/217 |
| 3,810,679 A | 5/1974 | Myers | |
| 4,388,771 A * | 6/1983 | Lalonde | 40/587 |
| 4,448,456 A | 5/1984 | Pfundstein | |
| 4,618,187 A | 10/1986 | Watanabe | |
| 4,981,329 A | 1/1991 | Koch et al. | |
| 5,222,785 A | 6/1993 | Green | |
| 5,290,094 A | 3/1994 | Gragg | |
| 5,494,337 A | 2/1996 | Behnke | |
| D373,102 S | 8/1996 | Choi | |
| 5,588,715 A | 12/1996 | Harlen | |
| 5,659,989 A | 8/1997 | Hsiao et al. | |
| 5,707,114 A * | 1/1998 | Schlanger | 301/58 |
| 5,806,935 A | 9/1998 | Shermeister | |
| 6,030,049 A | 2/2000 | Russell | |
| 6,120,104 A | 9/2000 | Okamoto et al. | |
| 6,486,582 B1 * | 11/2002 | Patarchi | 310/166 |
| 6,554,370 B2 | 4/2003 | Fowlkes | |

\* cited by examiner

*Primary Examiner*—Russell D. Stormer
(74) *Attorney, Agent, or Firm*—Eric Karich

(57) ABSTRACT

A wheel is disclosed including a first support having a first axis, a second support having a second axis, a rim having a third axis and two opposed side surfaces, and a spinner assembly having a fourth axis. The first and second supports are connected to different ones of the side surfaces of the rim, and the spinner assembly is rotatably mounted between the first and second supports, such that the first, second, third, and fourth axes are aligned. A method for assembling the wheel is also described.

17 Claims, 6 Drawing Sheets

WHEEL WITH CENTER SPINNER

BACKGROUND OF THE INVENTION

1. Field of the Invention

This invention relates generally to decorative spinners for wheels, and more particularly to a wheel with a decorative spinner in the center of the wheel.

2. Description of Related Art

Wheels and wheel covers have been developed with spinning ornamental components (i.e., spinners) that rotate independent of the wheels. Such wheels and wheel covers provide observers with attention-getting illusions. For example, when a vehicle with such wheels or wheel covers is moving and the wheels are rotating, the spinners may be rotating very slowly or not at all, providing observers with the illusion that the wheels are rotating slowly or not at all. Further, when the vehicle comes to a stop and the wheels stop rotating, the spinners may continue to rotate, providing observers with the illusion that the wheels are still rotating.

Examples of Spinners Include the Following:

Fitzgerald, U.S. Pat. No. 6,663,187, teaches a free wheeling spinner mountable on a wheel by means of an adapter for accommodating wheels with similar bolt patterns and varying diameters.

The spinner is mounted to the adapter by means of a bearing of inner and outer races secured respectively to the adapter and the spinner. Elongated lug nuts having a threaded free end receive bolts for securing the adapter to the automobile wheel.

Fowlkes, U.S. Pat. No. 6,554,370, teaches a wheel spinner assembly that is mountable onto a corresponding wheel of a vehicle. The assembly includes a wheel mount supportable by the wheel. A spinner mount is connected to the wheel mount. A bearing assembly is supported by the spinner mount. A spinner is supported by the bearing assembly, wherein the bearing assembly allows the spinner to rotate independently relative to the corresponding wheel as the vehicle is in motion.

Other patents of interest include Marshall, U.S. Pat. No. 3,722,958, Gragg, U.S. Pat. No. 5,290,094, Butler, Jr., U.S. Pat. No. 3,005,906, Green, U.S. Pat. No. 5,222,785, Lees, U.S. Pat. No. 6,264,284, and Russell, U.S. Pat. No. 6,030,049.

Certain types of vehicles, such as motorcycles, typically have wheels mounted to frames via axle rods. It would thus be beneficial to have a wheel including a spinner mounted on the center so that the wheel can be mounted via an axle rod. Such a center spinning wheel could also be mounted on other types of wheels, for other vehicles, as well.

SUMMARY OF THE INVENTION

A wheel is disclosed including a first support having a first axis, a second support having a second axis, a rim having a third axis and two opposed side surfaces, and a spinner assembly having a fourth axis. The first and second supports are connected to different ones of the side surfaces of the rim, and the spinner assembly is rotatably mounted between the first and second supports, such that the first, second, third, and fourth axes are aligned. A method for assembling the wheel is also described.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
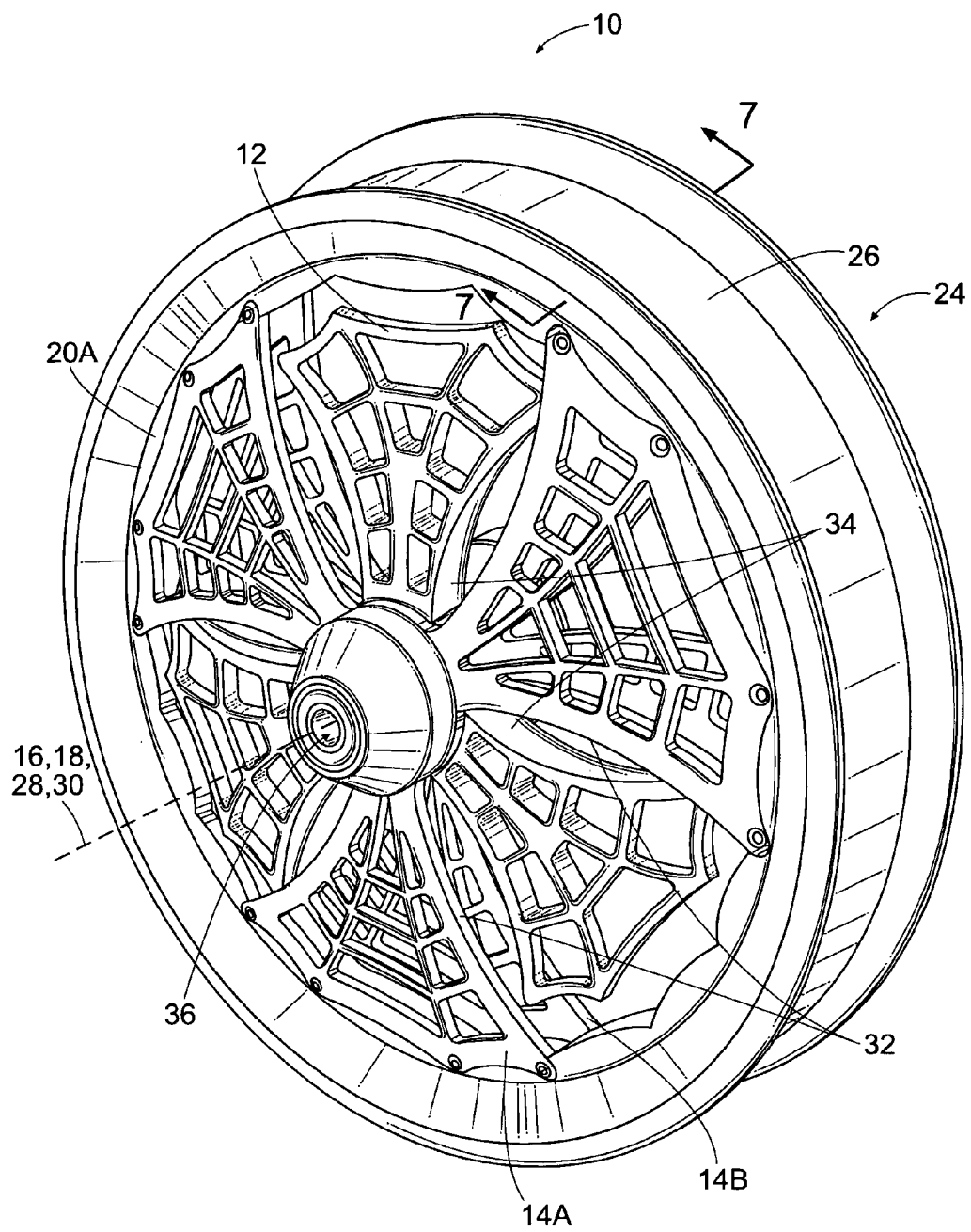
FIG. 1 is a perspective view of one embodiment of a wheel having a spinner assembly rotatably mounted between a pair of supports.
Figure 7:
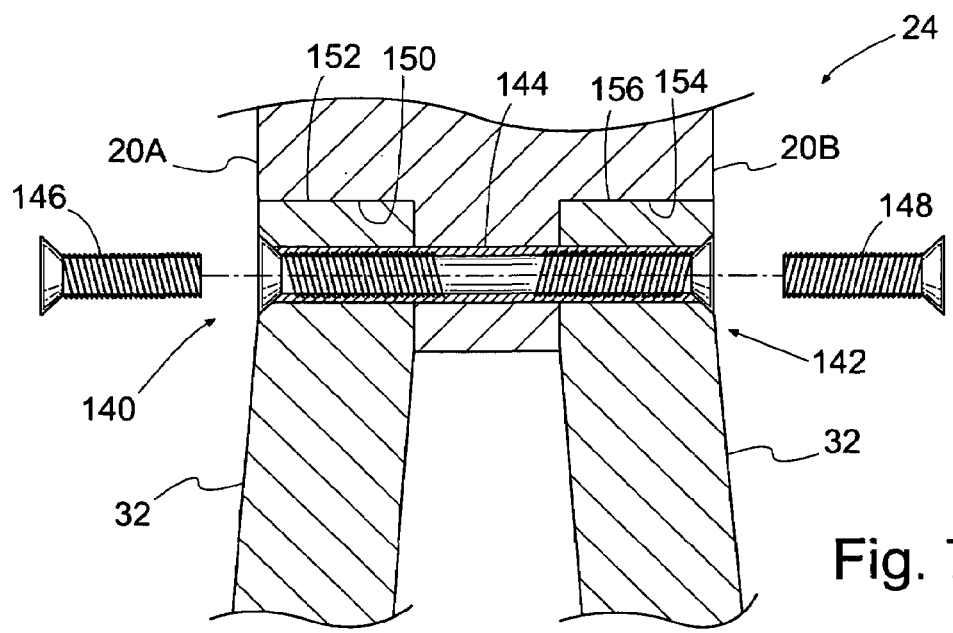
FIG. 7 is a sectional view of a portion of the wheel of FIG. 1 as indicated by lines 7—7 in FIG. 1.

FIG. 1 is a perspective view of one embodiment of a wheel 10 having a spinner assembly 12 rotatably mounted between a pair of supports 14A and 14B. The first support 14A has a first axis 16, and the second support 14B has a second axis 18. The first support 14A is connected to a side surface 20A of a rim 24. An opposed side surface 20B, shown in FIG. 7, is connected to the second support 14B. The rim 24 has an outer surface 26 adapted to receive a tire (not shown). The rim 24 has a third axis 28, and the spinner assembly 12 has a fourth axis 30. As indicated in FIG. 1, the spinner assembly 12 is rotatably mounted between the first and second supports 14A and 14B such that the axes 16 and 18 of the respective supports 14A and 14B, the axis 28 of the rim 24, and the axis 30 of the spinner assembly 12 are all aligned.

The first support 14A is visible in FIG. 1, and in the embodiment of FIG. 1 the second support 14B is substantially identical. In general, the first support 14A has a central hub portion and a spanning portion extending from the hub portion, wherein the spanning portion is adapted for connection to the side surface 20A of the rim 24. In the embodiment of FIG. 1 the spanning portion of the first support 14A includes multiple spokes 32, wherein each of the spokes 32 is adapted for connection to the side surface 20A of the rim 24.

While this structure illustrates one embodiment of the wheel 10, those skilled in the art will recognize that the first and second supports 14A and 14B could have a wide variety of structures and still remain within the scope of the present invention, as claimed. The first and second supports 14A and 14B are not required to be identical, and they are not required to have any particular structure, except as required for the structural stability of the wheel 10. A wide variety of shapes, designs, or other features could be incorporated without deviating from the invention as claimed.

In general, the spinner includes a central hub portion and a decorative portion extending from the hub portion. In the embodiment of FIG. 1, the decorative portion may include multiple arms 34, wherein each of the arms 34 resembles one of the spokes 32. However, as with the first and second supports 14A and 14B described above, the decorative portion could include any number of shapes, designs, or other features that enhance the ornamental design of the wheel 10.

In general, the spinner assembly 12 rotates about the axis 30 independent of other components of the wheel 10. When a vehicle including the wheel 10 is moving and the rim 24 and the connected supports 14A and 14B are rotating, the spinner assembly 12 may be rotating very slowly or not at all; further, when the vehicle comes to a stop and the rim 24 and the connected supports 14A and 14B are not rotating, the spinner assembly 12 may continue to rotate. The contrast between the rates of rotation of the spinner assembly 12 and the rim 24 and the connected supports 14A and 14B, provides a unique visual effect.

In the embodiment of FIG. 1, the wheel 10 has a hole 36 extending through a central portion of the wheel 10 and dimensioned to receive an axle rod (not shown) of a vehicle. As a result, the wheel 10 of FIG. 1 is particularly suited for use on vehicles wherein wheels are attached via axle rods (e.g., motorcycles). As indicated in FIG. 1, the aligned axes 16 and 18 of the respective supports 14A and 14B, 28 of the rim 24, and 30 of the spinner assembly 12 pass through the hole 36. While one particular embodiment of the wheel 10 is shown, those skilled in the art will recognize that the wheel 10 can be adapted to almost any wheeled vehicle, including but not limited to cars, scooters, golf carts, skateboards, or indeed any form of wheeled vehicle.

Figure 2:
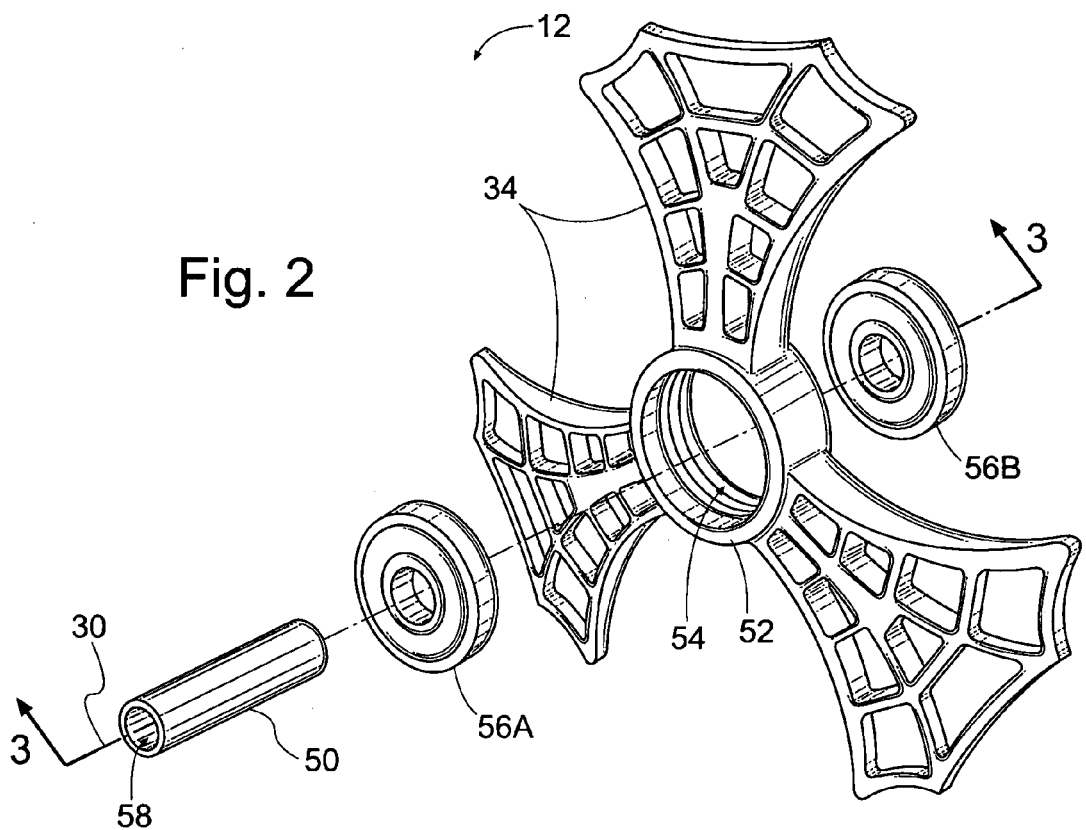
FIG. 2 is an exploded view of one embodiment of the spinner assembly of FIG. 1 and an associated tube of the wheel of FIG. 1.

FIG. 2 is an exploded view of one embodiment of the spinner assembly 12 of FIG. 1 and an associated tube 50 of the wheel 10 of FIG. 1. A central hub portion 52 of the spinner assembly 12 has a central aperture 54 that is adapted to receive a pair of ball bearings 56A and 56B. A decorative portion, in this embodiment the multiple arms 34, extends radially outward from the hub portion 52. The tube 50 has a central opening 58 dimensioned to receive the axle rod. The tube 50 has a predetermined length and functions as a spacer, and also keeps various components of the wheel 10 of FIG. 1 in alignment. Each of the ball bearings 56A and 56B has a central opening, and in assembly the tube 50 passes through the central openings in each of the ball bearings 56A and 56B. (See FIG. 3.)

Figure 3:
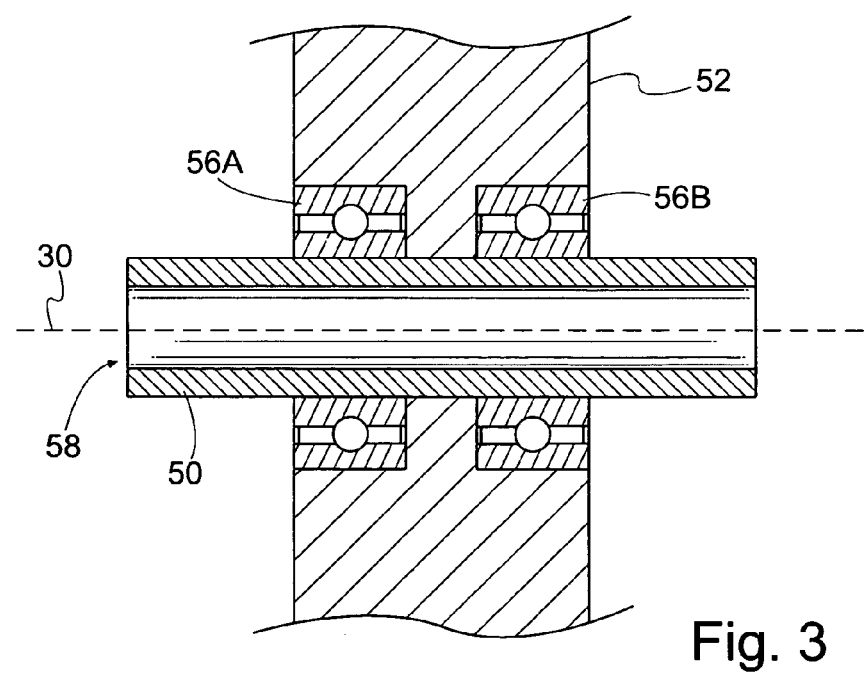
FIG. 3 is a sectional view of the spinner assembly and the associated tube of FIG. 2 in assembly and as indicated by lines 3—3 in FIG. 2.

It is noted that although bearings 56A and 56B are ball bearings in the embodiment of FIG. 2, other types of bearings may also be used. Further, although the embodiment of FIG. 2 includes a pair of ball bearings 56A and 56B, other embodiments of the spinner assembly 12 may have a single bearing, or more than 2 bearings, mounted in the central aperture 54. FIG. 3 is a sectional view of the spinner assembly 12 and the associated tube 50 of FIG. 2 in assembly and as indicated in FIG. 2.

Figure 4:
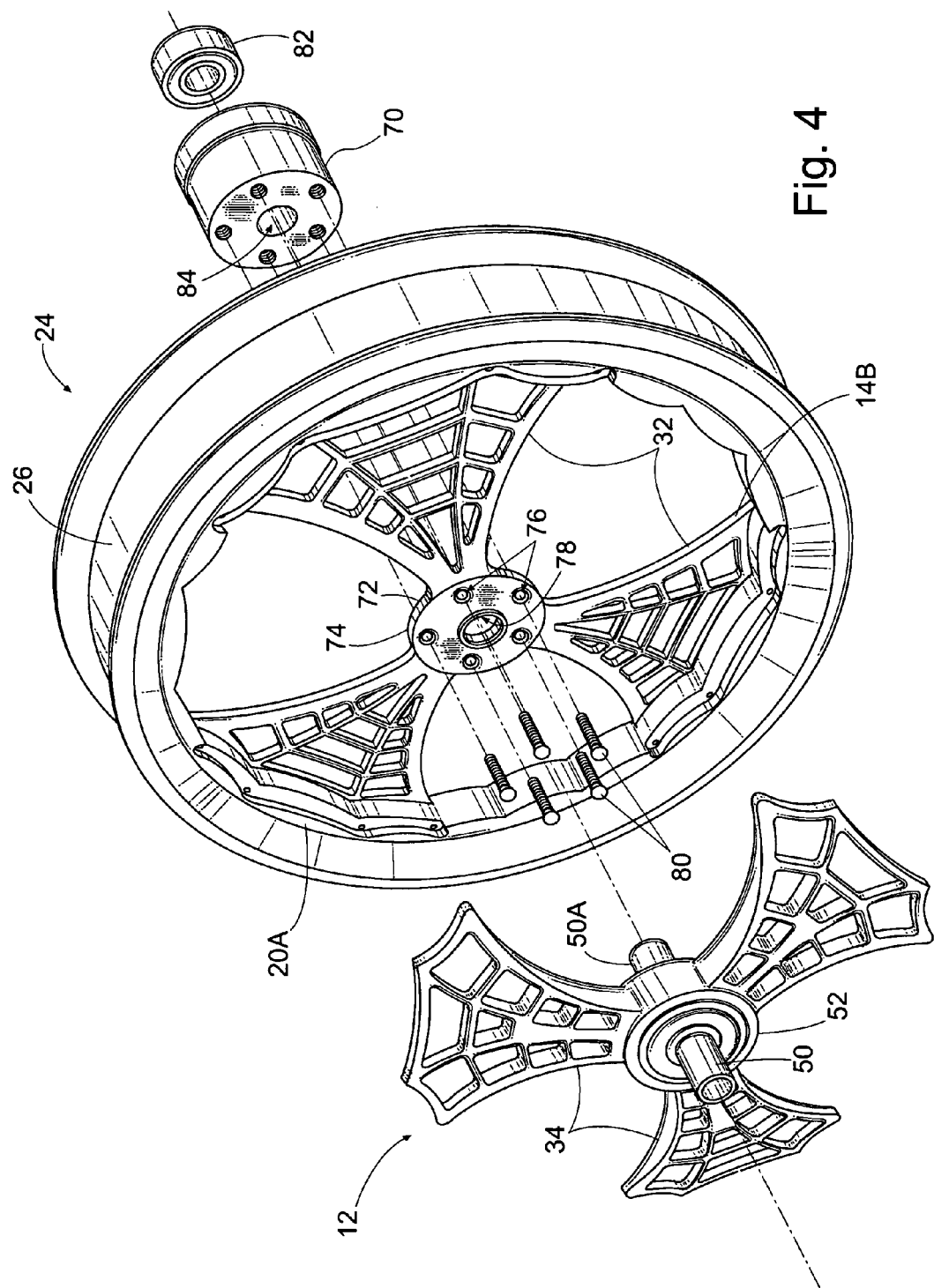
FIG. 4 is an exploded view of a portion of the wheel of FIG. 1 depicting a step of an assembly method wherein the spinner assembly is rotatably mounted to one of the supports via the tube.
Figure 5:
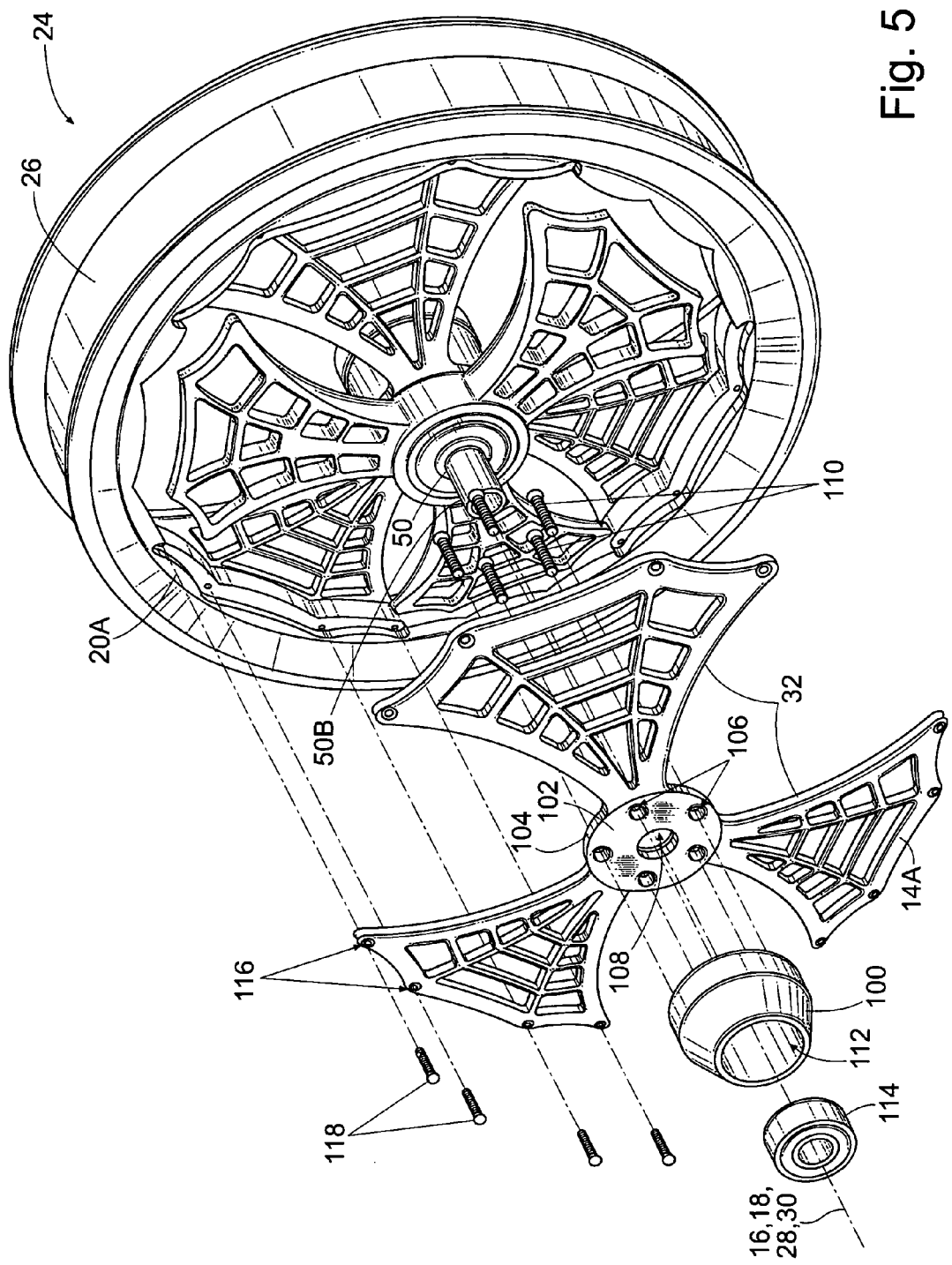
FIG. 5 is an exploded view of a portion of the wheel of FIG. 1 depicting another step of the assembly method wherein the other support is connected a side surface of a rim such that the spinner assembly is rotatably mounted between the supports.

FIGS. 4 and 5 will now be used to illustrate one embodiment of a method for assembling the wheel 10 of FIG. 1. In FIG. 4, the second support 14B has already been connected (e.g., bolted) to the corresponding side surface of the rim 24. A hub extension 70 is connected to an outer surface 72 of a central hub portion 74 of the second support 14B. As described above, the second support 14B includes multiple spokes 32 extending from the central hub portion 74. In the embodiment of FIG. 4, the central hub portion 74 has five holes 76 surrounding a central aperture 78. Five bolts 80 are used to connect a side of the hub extension 70 to the outer surface 72 of a central hub portion 74 of the second support 14B. While bolts 80 are illustrated in the present embodiment, additional connectors such as dowels (not shown) may also be added to increase the strength of the connection, as is well known in the art.

Connected to the central hub portion 74 of the second support 14B, the hub extension 70 forms a part of the second support 14B. The hub extension 70 has a hole 84 passing therethrough. The tube 50 has two opposed ends, and mouth of the hole 84 in the side of the hub extension 70 connected to the central hub portion 74 of the second support 14B is dimensioned to receive an end 50A of the tube 50. It is noted that the hub extension 70 may be adapted to receive a drive belt, a drive pulley, and/or a disk brake rotor.

FIG. 4 is an exploded view of a portion of the wheel 10 of FIG. 1 depicting a step of the assembly method wherein the spinner assembly 12 is rotatably mounted to the second support 14B via the tube 50 such the tube 50 passes through the central aperture 54 of the spinner assembly 12 (see FIG. 2) and the end 50A of the tube 50 is received in the second support 14B. In FIG. 4 the tube 50 has been passed through the central openings of the ball bearings 56A and 56B mounted in the central aperture 54 of the spinner assembly 12. The end 50A of the tube 50 is passed through the central aperture 78 of the second support 14B and into the mouth of the hole 84 in the side of the hub extension 70 of the second support 14B. In the embodiment of FIG. 4 a ball bearing 82 is mounted in a mouth of the hole 84 in a side of the hub extension 70 opposite the side connected to the central hub portion 74 of the second support 14B.

FIG. 5 is an exploded view of a portion of the wheel 10 of FIG. 1 depicting another step of the assembly method wherein the first support 14A is connected the side surface 20A of the rim 24 such that an end 50B of the tube 50, opposite the end 50A of FIG. 4, is received in the first support 14A. A hub extension 100 is connected to an outer surface 102 of a central hub portion 104 of the first support 14A. As described above, the first support 14A includes multiple spokes 32 extending from the central hub portion 104. In the embodiment of FIG. 5, the central hub portion 104 has five holes 106 surrounding a central aperture 108. Five bolts 110 are used to connect a side of the hub extension 100 to the outer surface 102 of the central hub portion 104 of the first support 14A.

Connected to the central hub portion 104 of the first support 14A, the hub extension 100 forms a part of the first support 14A. The hub extension 100 has a hole 112 passing therethrough. A mouth of the hole 112 in the side of the hub extension 100 connected to the central hub portion 104 of the first support 14A is dimensioned to receive the end 50B of the tube 50.

The end 50B of the tube 50 is passed through the central aperture 108 of the first support 14A and into the mouth of the hole 112 in the side of the hub extension 100. In the embodiment of FIG. 5 a ball bearing 114 is mounted in a mouth of the hole 112 in a side of the hub extension 100 opposite the side connected to the central hub portion 104 of the first support 14A.

As described above, each of the spokes 32 is adapted for connection to the side surface 20A of the rim 24. In the embodiment of FIG. 5, each of the spokes 32 has 4 holes 116 along an outer edge. As described in more detail below, four holes extend through the rim 24 between the side surface 20A and an opposite side surface for each of the spokes 32, and an internally threaded tube is inserted into each of the holes. To connect one of the spokes 32 to the side surface 20A of the rim 24, each of four bolts 118 is passed through a hole in the spoke 32 and threaded into a corresponding one of the internally threaded tubes. After the spokes 32 of the first support 14A are connected to the side surface 20A of the rim 24, the spinner assembly 12 is rotatably mounted between the supports 14A and 14B.

Figure 6:
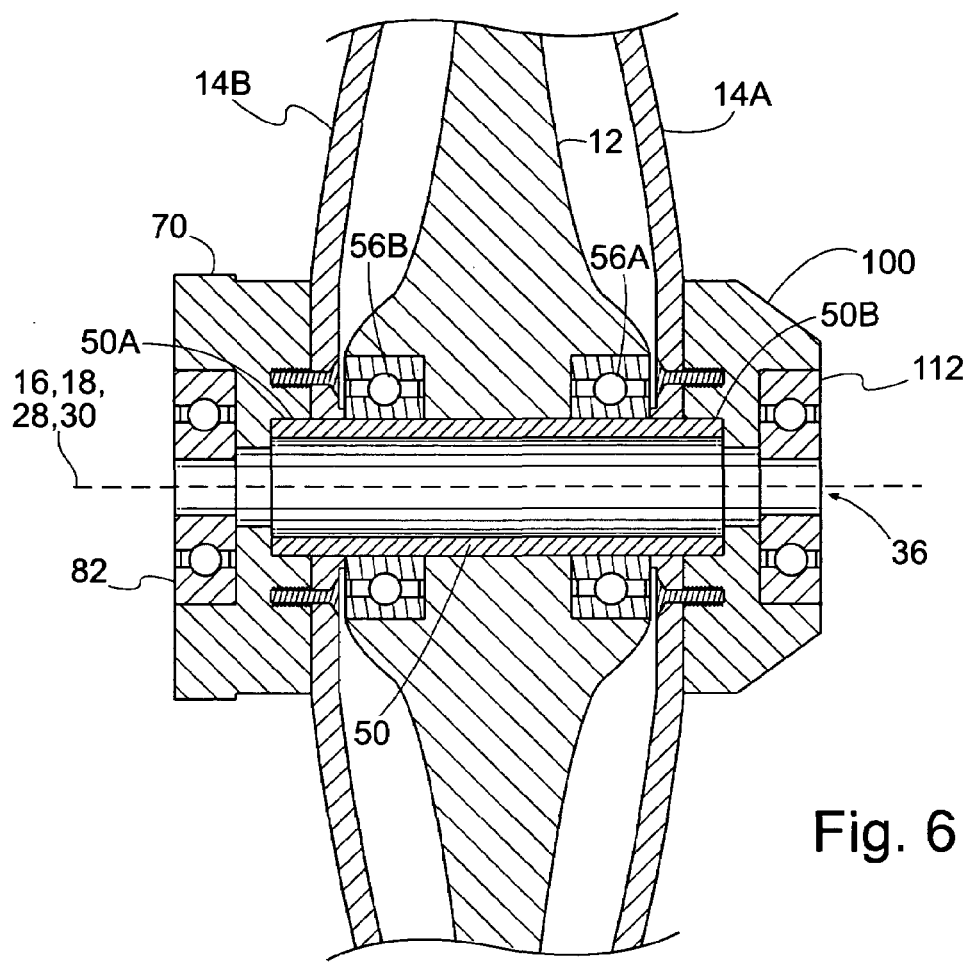
FIG. 6 is a sectional view of a central portion of the wheel of FIG. 1.

FIG. 6 is a sectional view of a central portion of the wheel 10 of FIG. 1, illustrating how the various components fit together in final assembly.

FIG. 7 is a sectional view of a portion of the wheel 10 as indicated by lines 7—7 in FIG. 1. FIG. 7 illustrates the above described mechanism used to connect the spokes 32 of the supports 14A and 14B to the respective side surfaces of the rim 24 of FIG. 1. In FIG. 7 the side surface 20A has a step 140 shaped to receive and frictionally engage an outer edge of a spoke 32 of the first support 14A, and the opposite side surface, labeled 20B, has a step 142 shaped to receive an outer edge of another spoke 32 of the second support 14B. A hole extends through the rim 24 between the side surfaces 20A and 20B, and an internally threaded tube 144 is positioned in the hole. To connect the spoke 32 of the first support 14A to the side surface 20A, a bolt 146 is passed through a corresponding hole in the spoke 32 and threaded into an end of the internally threaded tube 144. To connect the spoke 32 of the second support 14B to the side surface 20B, a bolt 148 is passed through a corresponding hole in the spoke 32 and threaded into an opposite end of the internally threaded tube 144. After being threaded into opposite ends of the internally threaded tube 144, the bolts 146 and 148 are preferably tightened simultaneously.

It is noted that an outer surface 150 of the spoke 32 of the first support 14A preferably contacts a corresponding surface 152 of the side surface 20A, and an outer surface 154 of the spoke 32 of the second support 14B preferably contacts a corresponding surface 156 of the side surface 20B, such that the tube 144 and the bolts 146 and 148 are not subjected to significant shear forces during use of the wheel 10. It is also noted that although bearings 82 (FIGS. 4 and 6) and 114 (FIGS. 5 and 6) are ball bearings in the embodiments shown and described, other types of bearings may also be used.

While FIG. 7 illustrates a preferred method of attaching the supports 14A and 14B, those skilled in the art will recognize that alternative attachment mechanisms may also be used, and such alternatives should be considered within the scope of the claimed invention.

Figure 8:
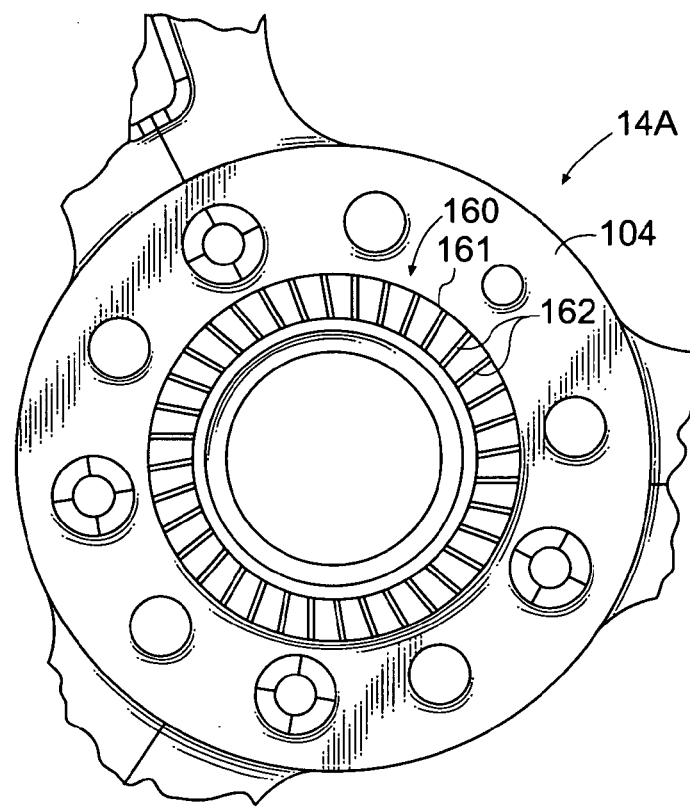
FIG. 8 is a front elevational view of an alternative embodiment of a central hub portion of one of the pair of supports, illustrating a water seal.
Figure 9:
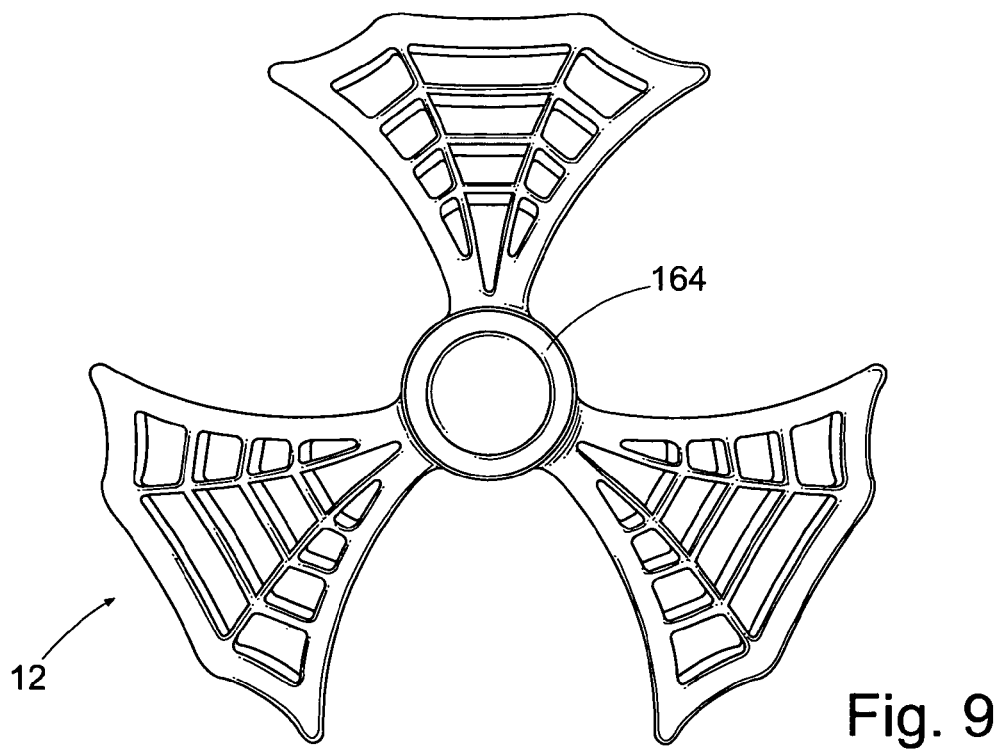
FIG. 9 is a side elevational view of an alternative embodiment of the spinner assembly adapted for use with the water seal shown in FIG. 8.

FIG. 8 is a front elevational view of an alternative embodiment of a central hub portion 104 of one of the pair of supports 14A, illustrating a water seal 160. The water seal 160 preferably includes a raised portion 161 that is raised about $60/1000$ inch, and a plurality of angled slots 162 through the raised portion 161. The water seal 160 is adapted to integrate with a channel 164 of the spinner assembly 12, as shown in FIG. 9. The raised portion 161 integrates with the channel 164 to exclude water and other contamination, and the angled slots 162 function to sling water away from the interior of the spinner assembly 12.

In an alternative embodiment, not shown, the spinner is replaced with a solid center support that does not spin. This embodiment is important because it maintains the unique 3-D appearance of the invention, albeit without the spinning feature of the inner portion. The outer supports may be removed to facilitate painting or otherwise embellishing the inner support.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A wheel, comprising:
   a rim comprising two opposed side surfaces and an outer surface adapted to receive a tire;
   a tube adapted to receive an axle rod and having two opposed ends;
   a first hub extension adapted to receive one of the two ends of the tube;
   a first support comprising a central hub portion and a spanning portion extending from the hub portion, wherein the central hub portion is adapted for connection to the first hub extension, and wherein the spanning portion is adapted for connection to one of the two side surfaces of the rim;
   a second hub extension adapted to receive the other of the two ends of the tube;
   a second support comprising a central hub portion and a spanning portion extending from the hub portion, wherein the central hub portion is adapted for connection to the second hub extension, and wherein the spanning portion is adapted for connection to the other of the two side surfaces of the rim;
   a spinner assembly comprising a hub portion and a decorative portion extending radially outward from the hub portion;
   wherein in assembly the first and second supports support the rim, and the spinner assembly is rotatably mounted about the tube and between the first and second supports such that the spinner assembly is free to rotate independently of the tube and the first and second supports; and
   wherein the rim, the first support, the second support, and the spinner assembly have axes, and wherein in assembly the axes of the rim, the first support, the second support, and the spinner assembly are aligned with one another.

2. The wheel as recited in claim 1, wherein the first and second supports are substantially identical.

3. The wheel as recited in claim 1, wherein the hub portions of the first and second supports each comprise a central aperture.

4. The wheel as recited in claim 3, wherein in assembly the tube extends through the central apertures of the first and second supports, one end of the tube is received in the first hub extension, and the other end of the tube is received in the second hub extension.

5. The wheel as recited in claim 1, wherein the spanning portions of the first and second supports each comprise a plurality of spokes.

6. The wheel as recited in claim 1, wherein the hub portion of the spinner assembly has a central aperture passing therethrough.

7. The wheel as recited in claim 6, further comprising at least one bearing mounted in the central aperture of the hub portion of the spinner assembly.

8. The wheel as recited in claim 6, wherein in assembly the tube extends through the central aperture of the spinner assembly, one end of the tube is received in the first hub extension, and the other end of the tube is received in the second hub extension.

9. The wheel as recited in claim 1, wherein the decorative portion of the spinner assembly comprises a plurality of arms.

10. The wheel as recited in claim 9, wherein each of the spanning portions of the first and second supports comprises a plurality of spokes, and wherein the arms of the decorative portion of the spinner assembly resemble the spokes.

11. A wheel, comprising:
a rim comprising two opposed side surfaces and an outer surface adapted to receive a tire;
a tube adapted to receive an axle rod aid having two opposed ends;
a first hub extension adapted to receive one of the two ends of the tube;
a first support comprising a central hub portion and a spanning portion extending from the hub portion, wherein the central hub portion is adapted for connection to the first hub extension, and wherein the spanning portion is adapted for connection to one of the two side surfaces of the rim, the first support having a central aperture;
a second hub extension adapted to receive the other of the two ends of the tube;
a second support comprising a central hub portion and a spanning portion extending from the hub portion, wherein the central hub portion is adapted for connection to the second hub extension, and wherein the spanning portion is adapted for connection to the other of the two side surfaces of the rim, the second support having a central aperture;
a spinner assembly comprising a hub portion and a decorative portion extending radially outward from the hub portion, the spinner assembly having a central aperture;
wherein in assembly the spinner assembly is rotatable mounted about the tube and between the first and second supports such that the spinner assembly is free to rotate independently of the tube and the first and second supports, and
wherein in assembly the tube extends through the central apertures of the first support, the second support, and the spinner assembly, one end of the tube is received in the first hub extension and the other end of the tube is received in the second hub extension.

12. The wheel as recited in claim 11, wherein the spinner assembly comprises at least one bearing mounted in the central aperture, and wherein in assembly the tube extends through a central opening of the at least one bearing.

13. The wheel as recited in claim 11, wherein the spanning portions of the first and second supports each comprise a plurality of spokes.

14. The wheel as recited in claim 11, wherein the decorative portion of the spinner assembly comprises a plurality of arms.

15. The wheel as recited in claim 14, wherein each of the spanning portions of the first and second supports comprises a plurality of spokes, and wherein the arms of the decorative portion of the spinner assembly resemble the spokes.

16. A method for assembling a wheel, comprising:
providing:
a rim comprising two opposed side surfaces and an outer surface adapted to receive a tire;
a tube adapted to receive an axle rod and having two opposed ends;
a first hub extension adapted to receive one of the two ends of the tube;
a first support comprising a central hub portion and a spanning portion extending from the hub portion, wherein the central hub portion is adapted for connection to the first hub extension, and wherein the spanning portion is adapted for connection to one of the two side surfaces of the rim:
a second hub extension adapted to receive the other of the two ends of the tube;
a second support comprising a central hub portion and a spanning portion extending from the hub portion, wherein the central hub portion is adapted for connection to the second hub extension, and wherein the spanning portion is adapted for connection to the other of the two side surfaces of the rim;
a spinner assembly comprising a hub portion and a decorative portion extending radially outward from the hub portion, the spinner assembly having a central aperture;
connecting the first hub extension to the central hub portion of the first support;
connecting the spanning portion of the first support to one of the two side surfaces of the rim;
rotatably mounting the spinner assembly to the first support via the tube such that the tube passes through the central aperture of the spinner assembly and one end of the tube is received in the first hub extension;
connecting the second hub extension to the central hub portion of the second support;
connecting the spanning portion of the second support to the other of the two side surfaces of the rim such that the other end of the tube is received in the second hub extension; and
wherein in assembly the spinner assembly is rotatable mounted about the tube and between the first and second supports such that the spinner assembly is free to rotate independently of the tube and the first and second supports.

17. The method as recited in claim 16, wherein the central aperture of the spinner assembly passes through the hub portion.

* * * * *